United States Patent

(12) United States Patent
Johnson

(10) Patent No.: US 9,771,992 B2
(45) Date of Patent: Sep. 26, 2017

(54) BRAKING

(75) Inventor: David Callum Johnson, Kenilworth (GB)

(73) Assignee: Meggitt Aerospace Limited (GB)

( * ) Notice: Subject to any disclaimer, the term of this patent is extended or adjusted under 35 U.S.C. 154(b) by 1380 days.

(21) Appl. No.: 12/525,731

(22) PCT Filed: Feb. 5, 2008

(86) PCT No.: PCT/GB2008/000385
§ 371 (c)(1),
(2), (4) Date: Dec. 7, 2009

(87) PCT Pub. No.: WO2008/096110
PCT Pub. Date: Aug. 14, 2008

(65) Prior Publication Data
US 2010/0090059 A1 Apr. 15, 2010

(30) Foreign Application Priority Data
Feb. 9, 2007 (GB) .................................. 0702500.0

(51) Int. Cl.
F16D 65/12 (2006.01)
F16D 55/00 (2006.01)
F16D 65/02 (2006.01)

(52) U.S. Cl.
CPC ...... *F16D 65/12* (2013.01); *F16D 2055/0095* (2013.01); *F16D 2065/132* (2013.01); *F16D 2200/0052* (2013.01); *Y10T 29/49718* (2015.01)

(58) Field of Classification Search
CPC ................. F16D 65/12; F16D 2065/13; F16D 2065/1304

USPC ............. 188/71.5, 71.7; 192/70.251; 29/233, 29/281.5, 402.03, 402.06, 402.07, 402.08
See application file for complete search history.

(56) References Cited

U.S. PATENT DOCUMENTS 2,964,138 A 12/1960 Orshansky
3,800,392 A 4/1974 Cook
3,895,693 A 7/1975 Lucien
(Continued)

FOREIGN PATENT DOCUMENTS

DE 19721647 A1 3/1998

*Primary Examiner* — Thomas J Williams
(74) *Attorney, Agent, or Firm* — Renner, Kenner, Greive, Bobak, Taylor & Weber Co., L.P.A.

(57) ABSTRACT

A brake apparatus (1) and method of operating the apparatus are disclosed. The apparatus (1) has a plurality of brake elements (2, 3, 4, 5, 6) with a combined thickness of Y. At least one of the brake elements (2, 3, 4, 5, 6) has a wear portion (22a, 22b) for tribological interaction with a wear portion (52b, 62a) of an adjacent element (5, 6) and is formed in two separable parts (21a, 21b) having thicknesses $A_1$ and $A_2$. The method includes operating an actuator (8) at an actuation extension length less than a maximum actuation extension length to cause the wear portions (22a, 22b, 52b, 62a) of the brake elements (2, 5, 6) to tribologically engage and thereby wear. This tribological engagement is such that as the elements (2, 5, 6) wear to a combined thickness of less than Y the extension length of the actuator is increased. A spacer (23) is inserted between the two parts (21a, 21b) of the brake element (2) to cause the wear portions (22a, 22b, 52b, 62a) to be tribologically engagable at a actuation extension length less than the increased actuation extension length.

11 Claims, 3 Drawing Sheets

(56) References Cited

U.S. PATENT DOCUMENTS

| | | | |
|---|---|---|---|
| 3,999,634 A | 12/1976 | Howell | |
| 4,418,796 A * | 12/1983 | Rittmann | 188/71.7 |
| 4,585,096 A | 4/1986 | Bok | |
| 4,982,818 A | 1/1991 | Pigford | |
| 5,099,960 A | 3/1992 | Alev | |
| 5,295,560 A | 3/1994 | Moseley | |
| 5,509,507 A * | 4/1996 | Wells et al. | 188/71.7 |
| 5,992,577 A | 11/1999 | Souetre | |
| 6,349,800 B1 * | 2/2002 | Nakamura | B62L 1/005 188/17 |
| 7,104,366 B2 * | 9/2006 | McAfee et al. | 188/71.7 |
| 2005/0011706 A1 * | 1/2005 | Johnson | 188/71.1 |

\* cited by examiner

BRAKING

The present invention relates generally to braking, for example braking systems for vehicles. More specifically, but not exclusively, the invention relates to an arrangement of brake discs for use in say, an aircraft braking system.

Aircraft braking systems generally comprise a stack of alternating stator discs and rotor discs. Typically, the stator discs are coupled to a torque tube which is fixed with respect to the airframe, while the rotor discs are coupled to a wheel assembly which is rotatably mounted to the airframe. The arrangement further includes a means for compressing the stack, thereby to reduce the angular speed of the rotor discs and wheel assembly to slow the aircraft.

Carbon-carbon composite (C-C) materials have become the established material of choice for brake discs used in the aforementioned aircraft braking systems. The high specific heat of carbon allows relatively large quantities of energy to be absorbed by a brake heat pack having a relatively low mass, thus providing an effective light weight brake disc stack.

The minimum mass, or reject mass, of the brake disc stack is generally determined by the energy which must be absorbed during the Reject-Take-Off, which is known to be the most demanding braking event. The mass of a new brake disc stack includes the required reject mass and an allowance for wear material. The mass of wear material is a function of the wear rate per stop and the number of stops that the brake disc stack will be subjected to during its service life.

It will be appreciated that as material is worn from the brake discs, the mass of the brake disc stack is reduced, which results in higher stack temperatures. The stack temperatures are therefore at their highest when the mass of the brake disc stack is at its lowest.

It will also be appreciated that aircraft weight is a major contributing factor to performance and operating costs. It is therefore desirable to minimise the size and weight of the braking system.

U.S. Pat. No. 5,992,577 discloses an arrangement in which spacers are used in order to maximise the service life of a brake disc stack whilst minimising the required wear stroke of the brake actuating piston, thereby to minimise the size and weight of the braking system. The spacers are fitted to one or both ends of the stack in order to replace the material thickness lost through wear during service.

Generally, brake disc material is worn away through use at substantially the same rate for all discs. Fitting the spacer to one or both ends of the stack adds material thickness to the outermost discs.

It has been observed that the cooling effect of the airflow around the brake disc stack in use is more effective for the outermost portions of brake disc stacks than it is for the central brake discs. Heat absorbed by the central discs requires more time in order to dissipate, thus resulting in the peak temperature being at the centre of the stack.

Consequently, the peak temperature of a brake disc stack which has been serviced as proposed by U.S. Pat. No. 599,577 may be higher than that of a new stack.

Accordingly, the present invention provides, in one aspect, a method of operating a brake apparatus having a plurality of brake elements with a combined thickness of Y, at least one of the brake elements having a wear portion for tribological interaction with a wear portion of an adjacent element and being formed in two separable parts having thicknesses A1 and A2, the method comprising operating an actuator at an actuation extension length less than a maximum actuation extension length to cause the wear portions of brake elements to tribologically engage and thereby wear, such that as the elements wear to a combined thickness of less than Y the extension length of the actuator is increased; inserting a spacer between the two parts of said at least one brake element to cause the wear portions to be tribologically engagable at a actuation extension length less than said increased actuation extension length.

This arrangement allows for, inter alia, a quick and simple means of extending the service life of a heat stack while ensuring that it exhibits a temperature distribution which is more evenly distributed across the stack.

The spacer may be inserted such that said at least one brake element has a total thickness greater than A1+A2.

The method may further comprise an additional step of securing the spacer to one or both of the two parts, for example releasably securing the spacer to one or both of the two parts.

A further spacer may be removed prior to inserting the spacer and/or two previously joined parts may be separated prior to inserting the spacer.

The at least one brake element may be provided in the centre of a heat stack of said brake apparatus.

A second aspect of the invention provides a brake apparatus for operation according to the method disclosed above, the apparatus comprising a heat stack and an actuator, the actuator having a maximum actuation extension length X and the heat stack comprising a plurality of brake elements having wear surfaces for tribological interaction, at least one of said brake elements being worn and at least one brake element having two releasably separable parts and a spacer inserted therebetween to allow the wear surfaces to tribologically engage at an actuation extension length of less than X.

The spacer may be coupled to one or both of the two parts and/or may be releasably secured to one or both of the two parts.

Preferably, the spacer and/or at least one of the elements comprises a carbon-carbon composite. Additionally or alternatively, the spacer may, comprise a siliconised carbon composite.

The braking elements may comprise at least one stator member and at least one rotor member. The braking elements may be brake discs, at least one of which may comprise a composite article having a wear layer and a core layer, the wear layer preferably having a lower density than the core layer.

A first brake disc may be coupled to the stator member and a second disc may be coupled to the rotor member, for example using a keyway arrangement.

The stator member may comprise a torque tube or torque shaft. The rotor member may comprise a wheel or wheel assembly.

The spacer may be coupled to the stator member or rotor member.

The two parts may be coupled together. Additionally or alternatively, the two parts may be releasably secured together, for example using one or more bolts.

In some embodiments, more than one brake disc comprises two parts which are separable from one another for receiving a spacer therebetween. At least one of the additional brake discs may comprise a spacer fitted between the respective two parts thereof.

According to another aspect of the invention, there is provided a brake disc for use as a brake element in the apparatus disclosed above, the disc having two releasably separable parts, each part having a wear portion and a body portion, the body portion of both being in abutting relationship.

A further aspect of the invention provides a brake disc for use in a brake disc stack, the disc comprising two parts which are separable from one another and a spacer fitted between the two parts.

A further aspect of the invention provides a method of operating a brake apparatus having a plurality of brake elements, at least one of the brake elements being formed in two separable parts each having a wear surface for tribological interaction with a wear surface of a respective adjacent brake element, the method comprising tribologically engaging at least one of the wear surfaces with an adjacent brake element to cause wear thereof, separating the parts and placing a spacer therebetween such that the at least one worn wear surface is positioned for tribological engagement with the adjacent wear surface.

It has been observed that resurfacing of the wear portion is not necessary where the wear surfaces are to be reused for tribological interaction with the same wear surface of an adjacent element.

One embodiment of the invention will now be described, by way of example only, with reference to the accompanying drawings in which.

Figure 1:
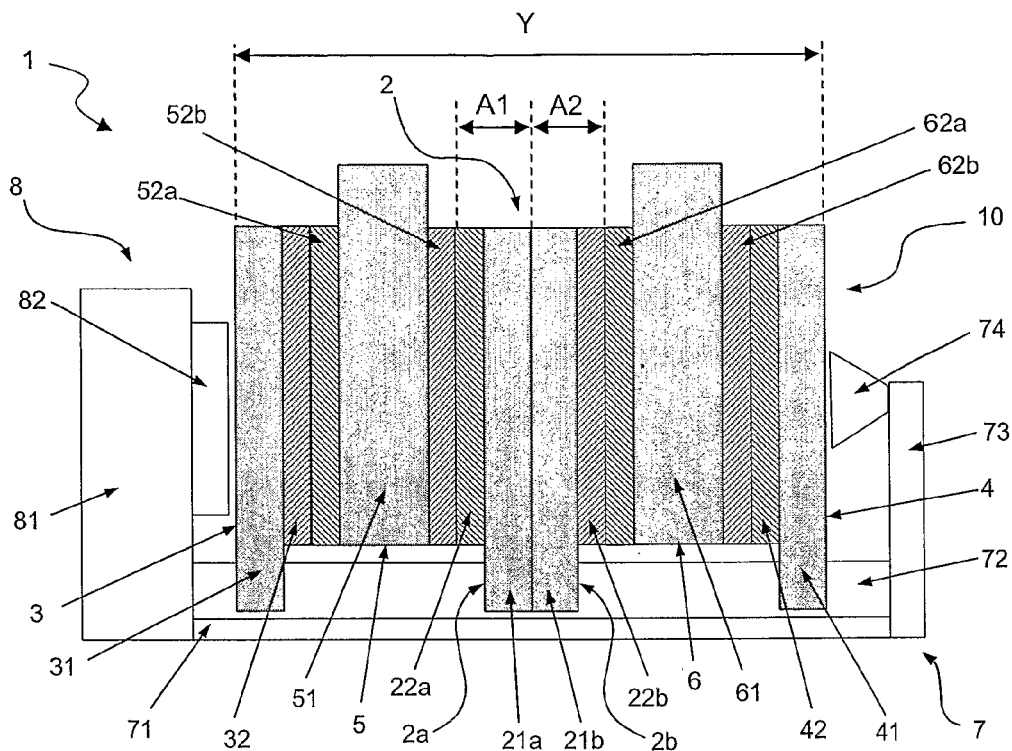
FIG. 1 is a schematic drawing of a brake disc stack according to the present invention.

Referring to FIG. 1, there is shown a braking system 1 incorporating the invention and including one central stator disc 2, two outer stator discs 3, 4, two rotor discs 5, 6, a torque tube assembly 7, an actuator assembly 8 and a wheel assembly (not shown).

The central stator disc 2 includes two half stator discs 2a, 2b, each half 2a, 2b having a respective thickness A1, A2 and comprising a core portion 21a, 21b with a wear portion 22a, 22b integrally formed therewith. Each of the outer stator discs 3, 4 includes a core portion 31, 41 having a wear portion 32, 42 provided thereon.

Each of the stator discs 2, 3, 4 includes a hole through its thickness which is substantially circular provided with internally facing castellations to form a keyway (not shown). The combined thickness of the core portions 21a, 21b of the central stator disc 2 is substantially greater than each of the core portions 31, 41 of the outer stator discs 3, 4.

Each of the rotor discs 5, 6 includes a core portion 51, 61 with a wear portion 52a, 52b, 62a, 62b on either side thereof and integrally formed therewith. Each of the rotor discs 5, 6 includes a hole through its thickness which is substantially circular. The thickness of each core portion 51, 61 is substantially the same as the combined thickness of the core portions 21a, 21b of the central stator 2.

The torque tube assembly 7 includes a tubular section 71 having a plurality of keyed protrusions 72, an end plate 73 and a plurality of thrust cones 74. The tubular section 71 is an elongate hollow cylinder and the keyed protrusions 72 protrude from the external surface thereof along its entire length. The keyed protrusions 72 are aligned along and equally spaced around the tubular section 71 to provide a keyed shaft. The end plate 73 is a circular disc having a circular hole (not shown) through its thickness and is secured, for example bolted using bolt means, to one end of the tubular section 71. The thrust cones 74 protrude from the end plate 73 on the side thereof which faces the tubular section 71. The thrust cones 74 are evenly spaced and positioned marginal to the circumferential edge of the end plate 73.

The actuator assembly 8 includes a piston housing 81 and a plurality of actuator pistons 82. The pistons housing 81 includes a plurality of holes (not shown) which are evenly spaced and positioned marginal to the circumferential edge of one of the major surfaces of the housing 81. The pistons 82 are slideably mounted in the holes (not shown) and their movement is actuated by known means, for example hydraulic pressure.

The stator discs 2, 3, 4 are mounted to the tubular section 71 in a spaced apart relationship and coupled thereto by virtue of the keyed protrusions 72 which cooperates with the aforementioned keyways (not shown) in the stator discs 2, 3, 4.

The rotor discs 5, 6 are mounted to the wheel assembly (not shown) in a spaced apart relationship and coupled thereto by a keyway arrangement (not shown).

In an assembled condition, the rotor discs 5, 6 are located in the spaces between the stator discs 2, 3, 4 such that each of the wear portions 32, 22a, 22b, 42 of the stator discs 2, 3, 4 is adjacent and facing a respective wear portion 52a, 52b, 62a, 62b of the rotor discs 5, 6. One of the outer stator discs 4 is adjacent the thrust cones 74 while the other outer stator disc 3 is adjacent the actuator pistons 82. The brake disc stack 10 has an overall thickness Y.

In use, the wheel assembly (not shown) and rotor discs 5, 6 rotate with respect to the torque tube assembly 7 and stator discs 2, 3, 4. A braking demand signal is received by the braking system, which actuates the pistons 82. This in turn causes the brake disc stack 10 to be compressed between the pistons 82 and the thrust cones 74. Friction forces between the wear portions 32-52a, 52b-22a, 22b-62a, 62b-42 result from the compression and cause the angular velocity of the rotor discs 5, 6 and wheel assembly (not shown) to decrease, thus slowing the aircraft.

Heat generated during brake actuation is dissipated within the mass of the brake discs 2, 3, 4, 5, 6, thereby increasing the temperature of the stack 10. This heat is dissipated by convection when the aircraft is stationary and forced convection when the aircraft is moving. The airflow around the stack which results from the movement of the aircraft removes heat from stack 10.

As discussed above, the thickness of the central discs 2, 5, 6 is substantially greater than the thickness of the outer stator discs 3, 4. This provides a more even temperature distribution than arrangements where brake disc thicknesses are substantially the same throughout the stack. This is due to the aforementioned phenomenon whereby the cooling effect of the airflow around the brake disc stack in use is more effective for the outermost portions of brake disc stacks than it is for the central brake discs Referring now to FIG. 2 there is shown the brake disc stack 1 of FIG. 1 in a partially worn condition. The wear portions 32', 52a', 52b', 22a', 22b', 62a', 62b', 42' are substantially thinner than new (i.e. as shown in FIG. 1), whilst the thickness of each of the core portions 31, 51, 21a, 21b, 61, 41 is substantially the same as new. The reduced thickness of the partially worn wear portions 22a', 22b' of the half stator discs 2a, 2b results in new, reduced, respective thicknesses A1', A2'.

Consequently, the thickness Y' of the worn brake disc stack 11 is substantially less than the thickness Y of the stack 11 as new. The worn thickness Y' corresponds to the predetermined maximum stroke of the actuator pistons 82, at which point the stack 11 must be serviced.

In order to service the brake disc stack 11, the actuator pistons 82 are retracted, the central stator disc halves 2a, 2b are separated and a spacer 23 is inserted therebetween. The spacer 23 is made of a carbon-carbon composite material similar to the material from which the stator discs 2, 3, 4 and rotor discs 5, 6 are made.

Advantageously, the spacer may be formed using one or more fully or partially worn brake discs from another brake disc stack, for example two worn brake discs bonded or mechanically joined together. In this embodiment, the spacer is free standing and need not be secured to the central stator disc halves 2a, 2b.

Figure 2:
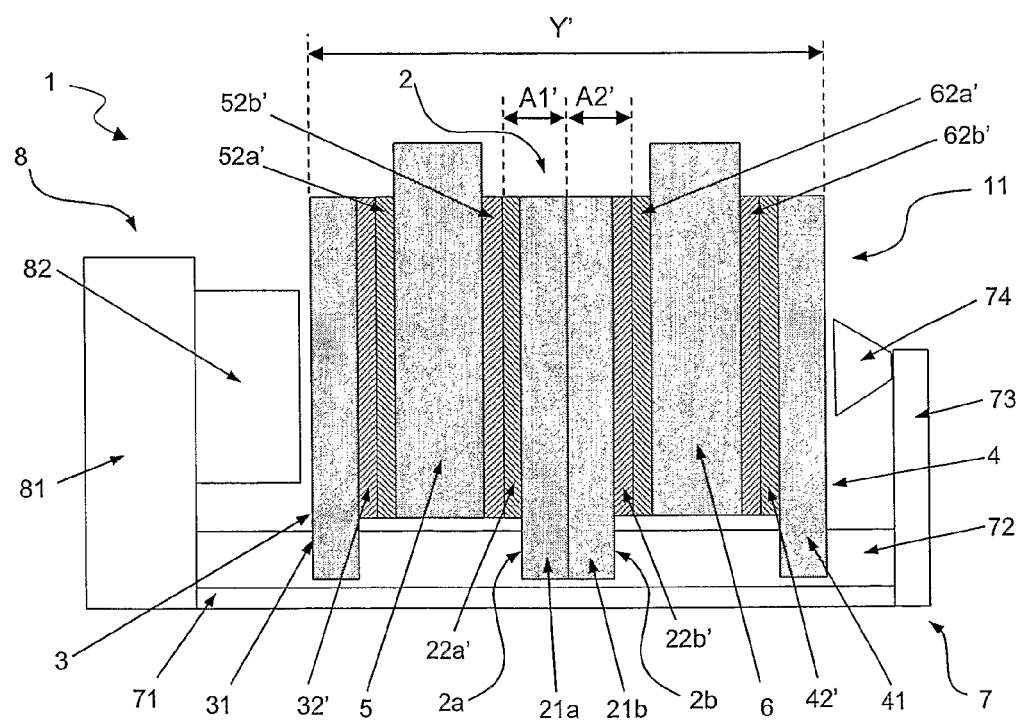
FIG. 2 is a schematic drawing of the brake disc stack of FIG. 1 in a partially worn condition.
Figure 3:
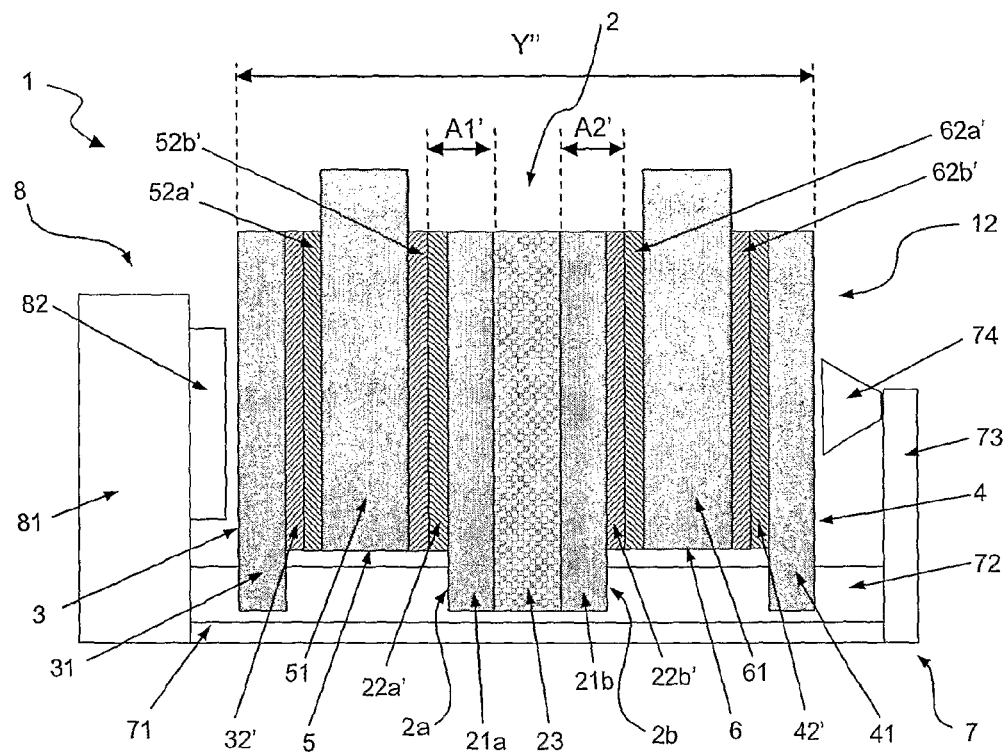
FIG. 3 is a schematic drawing of the brake disc stack of FIG. 2 with the spacer fitted.

FIG. 3 shows the brake disc stack 11 of FIG. 2 with the spacer 23 fitted between the two central stator halves 2a, 2b. Thus, the total effective thickness of the central stator disc 2 is equal to the sum of the thicknesses A1'+A2' of the partially worn half stator discs 2a, 2b and the thickness of the spacer 23. The spacer 23 is sized and dimensioned such that the thickness Y" of the serviced brake disc stack 12 is substantially the same as the thickness Y of the original stack 10.

However, the mass of the spacer 23 contributes to the heat absorbing mass of the central stator disc 2, whereas the material lost due to wear of the stack 10 was included in the wear portions 32, 52a, 52b, 22a, 22b, 62a, 62b.

Consequently, the central stator disc 2' is able to absorb the same amount or, preferably, more heat than the original central stator disc 2. The temperature distribution across the serviced stack 12 in use also reflects this preferable difference, which will be discussed below.

Figure 4:
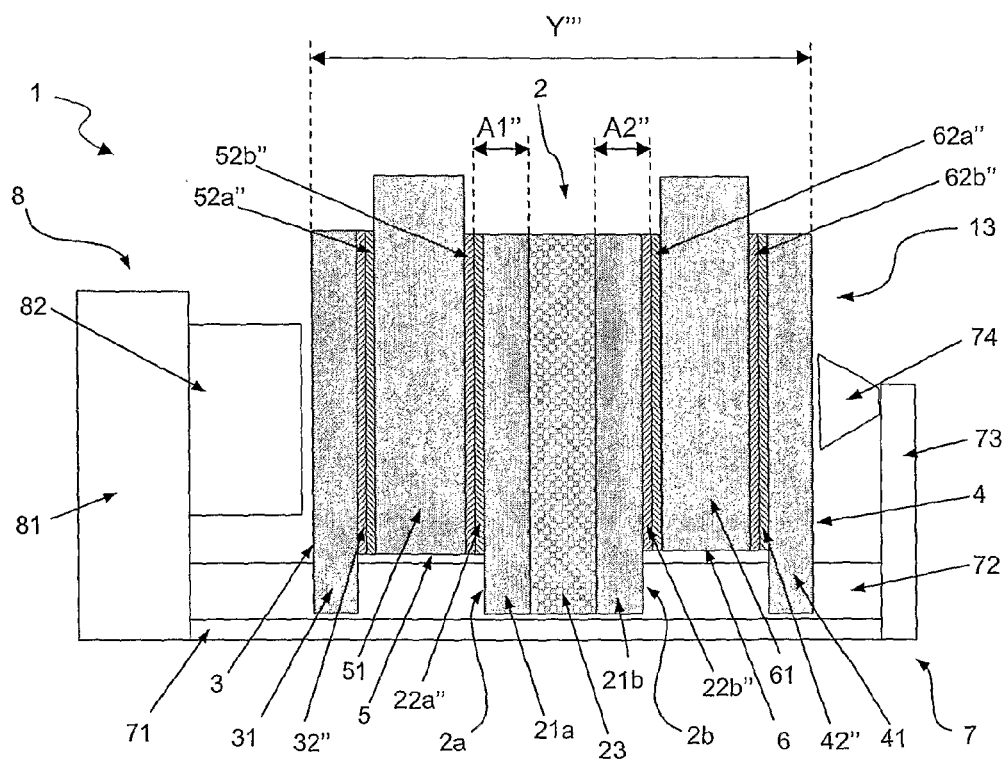
FIG. 4 is a schematic drawing of the brake disc stack of FIG. 3 in a fully worn condition.

Referring now to FIG. 4, there is shown a fully worn brake disc stack 13 having thickness Y'''. The worn thickness Y''' of heat stack 13 is substantially the same as thickness Y' of the worn stack 11 and corresponds to the maximum stroke of the actuator pistons 82. The mass of the wear portions 32", 52a", 52b", 22a", 22b", 62a", 62b", 42" equates to a predetermined minimum safe value. The reduced thickness of the fully worn wear portions 22a", 22b" of the half stator discs 2a, 2b results in final, reduced, respective thicknesses A1', A2'. The fully worn discs 2a, 2b, 3, 4, 5, 6 must either be discarded or reworked for use as, for example, a spacer 23.

Figure 5:
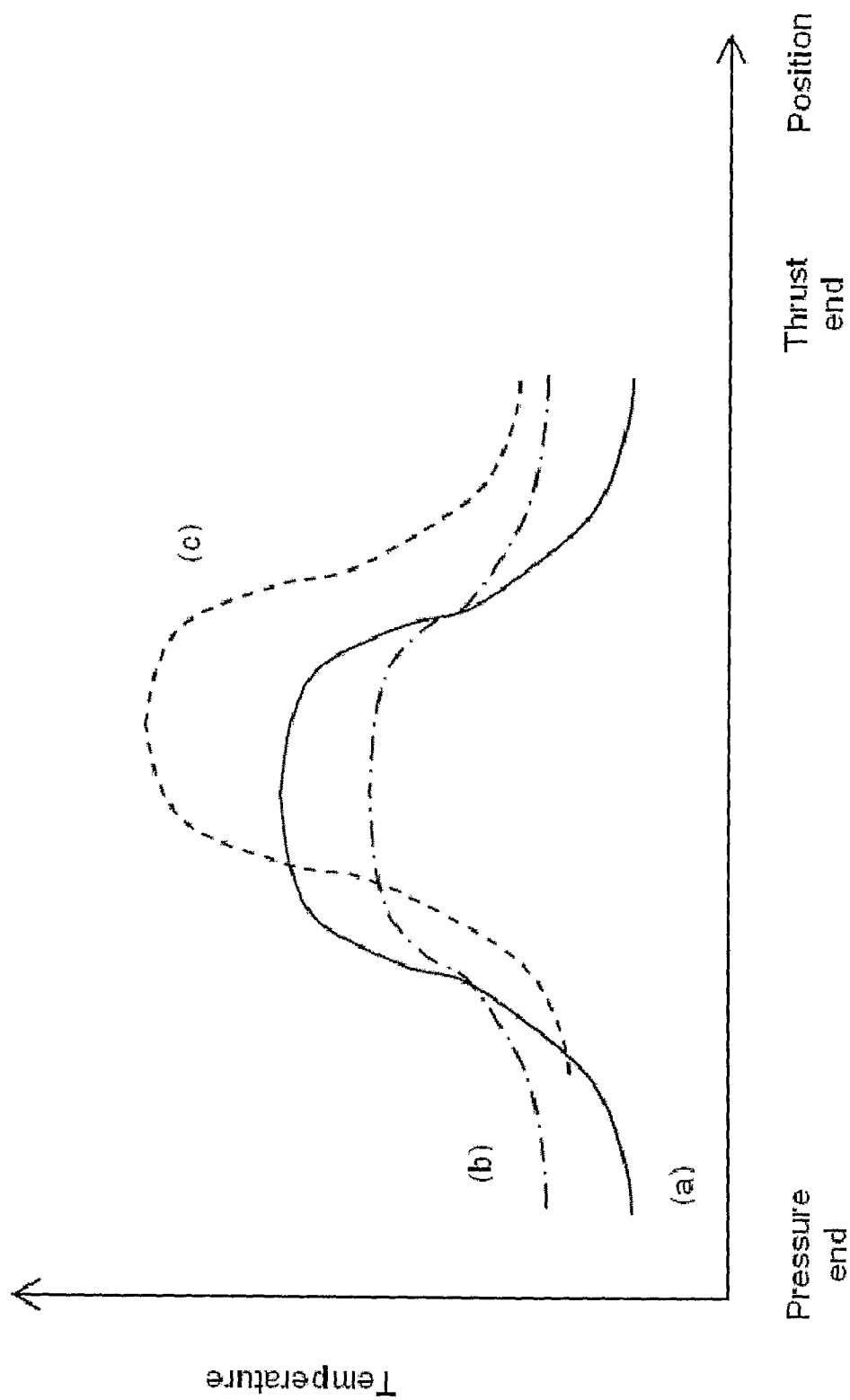
FIG. 5 is a graphical representation of the temperature profile of different brake disc stack arrangements.

In FIG. 5 there is shown a graph which illustrates the in use temperature profile A for the brake disc stack 10 of FIG. 1, the in use temperature profile B for the serviced brake disc stack 12 shown in FIG. 3 and the in use temperature profile C for a serviced brake disc stack of the prior art with the spacer fitted at the piston 82 end of the stack. The "pressure end" depicts the end of the stack adjacent the actuator assembly 8 and the "thrust end" depicts the end adjacent the thrust cones 74.

It will be appreciated that the temperature profile for the serviced stack 12 is more evenly distributed than the profile A of the original stack 10 or the profile C of the known spacer fitment arrangement from the prior art.

It can also be seen that the peak temperature, of the temperature of profile B, which is at the centre of the stack 12, is less than the peak temperature of the temperature profile A for the brake disc stack 10 as new as well as the temperature profile C of a known spacer fitment arrangement of the prior art.

The present invention therefore provides a means for easily altering the thickness of one of the discs by inserting a spacer between two disc halves in a brake disc stack. This arrangement allows for friction mating surfaces to be retained, thus precluding the need for rework. The invention further provides a means for easily altering the temperature distribution of the stack in use by adjusting the thickness and/or material from which the spacer 23 is made.

It will be appreciated that several variations to the embodiment described above are envisaged without departing from the scope of the invention. For example, the brake disc stack 10, 11, 12 may comprise a two-piece rotor 5, 6 in place of, or in addition to, the two-piece stator 2a, 2b. In the case of a two-piece rotor 5, 6, the two rotor halves could be secured together, for example using one or more bolts, rivets or other mechanical fixings.

Alternatively or additionally, the brake disc stack 10, 11, 12 may include two or more two-piece stators 2, 3, 4 and/or rotors 5, 6. Spacers 23 may be fitted between one or more of the two-piece stators 2, 3, 4 and/or rotors 5, 6. The position of the two-piece stator 2, 3, 4 and for rotors 5, 6 is preferably at or towards the centre of the stack although it need not be, it may be at one end for example.

The modular nature of the two part brake disc concept of the invention also provides a number of advantages. For example, as mentioned above it is possible to provide a brake disc stack having discs 2, 3, 4, 5, 6 which all comprise two part discs.

Uneven wear is a known issue in carbon disc stacks. In the case where uneven wear occurs at one end of the brake disc stack 10, the half discs may be rearranged during a service in order to equalise the wear through the life of the brake disc stack 10.

Moreover, in conventional brake disc arrangements, the pistons and/or thrust cones cause indentations in the brake discs, which may result in inaccurate wear indication or, in extreme cases, premature disc failure. The modular nature of the present invention allows for rearrangement during a service of the half discs such that new surfaces are in contact with the actuator pistons and/or thrust cones.

It may also be advantageous to fit spacers 23 formed from a different material, for example a siliconised carbon composite, for different applications and/or between one or more two-piece stators 2, 3, 4 and/or rotors 5, 6.

Spacers 23 may be fitted in the stack 10 as new and replaced with further spacers 23, formed from different materials and/or having different thicknesses, during an overhaul or service.

The spacers 23 may be secured to adjacent brake discs 2, 3, 4, 5, 6 in the stack and/or directly to the tubular section 71 or wheel assembly (not shown) as appropriate.

Furthermore, whilst the core portions 31, 51, 21a, 21b, 61, 41 and the wear portions 32, 52a, 52b, 22a, 22b, 62a, 62b, 42 of the brake discs 2, 3, 4, 5, 6 in the embodiment disclosed above are formed from the same material, they may be formed using different materials. For example each or one or more brake disc may be prepared in accordance with GB 2403989, the entire contents of which are included by reference herein.

Moreover, the discs may be formed from low wear material, as disclosed in our International (PCT) patent application, published as WO01/38256.

The tubular section 71 may comprise a single keyed protrusion 72 or two or more protrusions 72 which may be evenly or unevenly spaced about the tubular section 71. Similarly, the wheel assembly (not shown) may comprise a single keyed protrusion (not shown) or two or more protrusions (not shown) which may be evenly or unevenly spaced thereabout. The keyed protrusion(s) 72 need not extend along the entire length of the tubular section 71 and/or may comprise an interrupted protrusion 72.

Alternatively, any other suitable means may be used to couple the stator discs 2, 3, 4 to the torque tube assembly 7 and/or to couple the rotor discs 5, 6 to the wheel assembly (not shown).

Whilst thrust cones 74 are used in the preferred embodiment, any suitable arrangement, for example the use of a plurality of pad shaped thrust members or a thrust ring, is envisaged without departing from the scope of the invention.

It should also be appreciated that the brake disc assembly disclosed herein may be used in any number of suitable braking systems and for any number of applications. The braking system may comprise, for example, an electromechanical actuation arrangement.

The invention claimed is:

1. A method of operating a brake apparatus having a plurality of brake elements and a first spacer with a combined thickness of Y, at least one of the brake elements having wear portions for tribological interaction with wear portions of adjacent brake elements at friction mating surfaces, said at least one brake element being formed in two separable parts having thicknesses $A_1$ and $A_2$, each of said separable parts comprising a separate and distinct core having a said wear portion, the method comprising operating an actuator at an actuation extension length less than a maximum actuation extension length to cause the wear portions of said adjacent brake elements to tribologically engage and thereby wear, such that as said brake elements wear to a combined thickness of less than Y the extension length of the actuator is increased; removing said first spacer; and inserting a second spacer between said cores of said at least one brake element to cause the wear portions to continue to be tribologically engageable at said friction mating surfaces without change as before insertion of said second spacer and at an actuation extension length less than said increased actuation extension length.

2. A method according to claim 1, comprising inserting said second spacer such that said at least one brake element has a total thickness greater than $A_1+A_2$.

3. A method as claimed in claim 1, further comprising an additional step of securing said second spacer to one or both of the cores.

4. A method as claimed in claim 3, further comprising releasably securing said second spacer to one or both of the cores.

5. A method as claimed in claim 1, further comprising separating the two cores prior to inserting said second spacer.

6. A method as claimed in claim 1, comprising providing said at least one brake element in the center of a heat stack of said brake apparatus.

7. Apparatus as claimed in claim 1, wherein the spacer comprises a carbon-carbon composite.

8. Apparatus as claimed in claim 1, wherein at least one of the brake elements comprises a carbon-carbon composite.

9. Apparatus as claimed in claim 1, wherein the spacer comprises a siliconised carbon composite.

10. Apparatus as claimed in claim 1, wherein said braking elements comprise at least one stator member and at least one rotor member.

11. Apparatus as claimed in claim 1, wherein the braking elements are brake discs.

* * * * *